United States Patent [19]
Helling et al.

[11] Patent Number: 5,310,643
[45] Date of Patent: May 10, 1994

[54] PHOTOGRAPHIC RECORDING MATERIAL CONTAINING A LIGHT-PROTECTIVE AGENT

[75] Inventors: Günter Helling, Odenthal; Jörg Hagemann, Cologne, both of Fed. Rep. of Germany

[73] Assignee: Agfa Gevaert Aktiangesellschaft, Leverkusen, Fed. Rep. of Germany

[21] Appl. No.: 967,819

[22] Filed: Oct. 28, 1992

[30] Foreign Application Priority Data

Nov. 11, 1991 [DE] Fed. Rep. of Germany ....... 4136965

[51] Int. Cl.$^5$ .................... G03C 7/396; G03C 7/38; G03C 1/34
[52] U.S. Cl. ................................... 430/551; 430/558; 430/609
[58] Field of Search ............... 430/551, 609, 558, 556, 430/557

[56] References Cited

U.S. PATENT DOCUMENTS

| | | | |
|---|---|---|---|
| 4,717,651 | 1/1988 | Ohki et al. | 430/551 |
| 4,943,519 | 7/1990 | Helling et al. | 430/551 |
| 5,153,109 | 10/1992 | Abe et al. | 430/551 |

FOREIGN PATENT DOCUMENTS

| | | |
|---|---|---|
| 0383354 | 8/1990 | European Pat. Off. . |
| 1547803 | 12/1970 | Fed. Rep. of Germany . |
| 2617826 | 11/1976 | Fed. Rep. of Germany . |
| 2952511 | 7/1980 | Fed. Rep. of Germany . |
| 3286848 | 11/1988 | Japan . |
| 1547302 | 6/1979 | United Kingdom . |
| 2066975 | 7/1981 | United Kingdom . |

OTHER PUBLICATIONS

European Search Report No. 92118519.5 Feb. 9, 1993.
English Language Abstract of Japanese JP-N 53 070 822.
English Language Abstract of JP-N 54 070 830.
English Language Abstract of JP-N 54 073 032.

*Primary Examiner*—Lee C. Wright
*Attorney, Agent, or Firm*—Connolly & Hutz

[57] ABSTRACT

Compounds corresponding to Formula I are suitable as light stabilizers for the image dyes produced from colour couplers by chromogenic development. They are also suitable as oil formers for the colour couplers. In a colour photographic recording material, they are preferably used in combination with a pyrazoloazole coupler and associated with a light-sensitive silver halide emulsion layer.

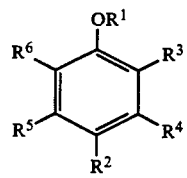

(I)

In Formula I,
  $R^1$ denotes H, a group which can be split off under alkaline conditions, alkyl or aryl;
  $R^2$ denotes OH, alkyl, aryl, alkoxy or

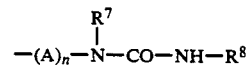

$R^3$, $R^4$, $R^5$ and $R^6$ denote H, OH, COOH, SO$_3$H, SO$_2$H, alkyl, aryl, alkoxy, sulphonyl, sulphamoyl, acylamino or

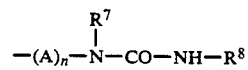

and at least one of the groups $R^2$, $R^3$, $R^4$ $R^5$ and $R^6$ is a group of the formula

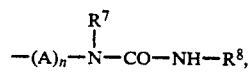

A denotes an alkylene group having 1-6 carbon atoms,
n stands for 0 or 1, (Abstract continued on next page.)

$R^7$ denotes H or an optionally substituted alkyl group, $R^8$ denotes the group of a polymer produced by polycondensation, in particular a polyester, polyether, polycarbonate, polyurethane or polyester polyurethane, $R^1$ and $R^3$ may form a 5-membered or 6-membered ring, in which case $R^2$=OH or alkoxy, and $R^2$ and $R^4$ may form a 5-membered or 6-membered carbocyclic ring.

4 Claims, No Drawings

PHOTOGRAPHIC RECORDING MATERIAL CONTAINING A LIGHT-PROTECTIVE AGENT

This invention relates to a photographic recording material having at least one silver halide emulsion layer containing novel light-protective agents for the image dyes produced by chromogenic development, in particular for yellow or magenta azomethine dyes.

It is known to produce coloured photographic images by chromogenic development, i.e. by developing silver halide emulsion layers which have been exposed imagewise by means of suitable colour forming developer substances, so-called colour developers, in the presence of suitable colour couplers, the oxidation production of developer substances produced in correspondence with the silver image reacting with the colour coupler to form a dye image. The colour developers used are generally aromatic compounds containing primary amino groups, in particular those of the p-phenylenediamine series.

It is also known that the image dyes produced by chromogenic development vary in the extent to which they undergo certain changes under the influence of environmental conditions. This is particularly noticeable with respect to the action of light. It is well known that magenta dyes produced from pyrazoloazole couplers undergo particularly severe bleaching whereas the cyan dyes produced from phenolic couplers are particularly resistant in this respect.

There has been no lack of attempts to overcome this defect by special measures. In the case of magenta couplers in particular improved resistance to light has been obtained by using light stabilizing additives or special couplers. Suitable light stabilizing agents for this purpose are mainly phenolic compounds, in particular derivatives of hydroquinone, which are either mixed with the couplers or linked to the coupler molecules in the form of substituents (DE-B-1 547 803, DE-A-26 17 826, DE-A-29 52 511, JP-N 53 070 822, JP-N 54 070 830, JP-N 54 073 032). The known light-protective agents, however, are not satisfactory in all respects.

It is an object of the present invention to provide new light-protective agents for photographic recording materials, in particular agents which are suitable for improving the stability to light of magenta image dyes produced from magenta couplers, in particular of the pyrazoloazole type, and yellow image dyes.

The present invention relates to a colour photographic recording material having at least one silver halide emulsion layer and a colour coupler associated therewith, characterised in that it contains a combination of a colour coupler and a compound corresponding to the general formula I

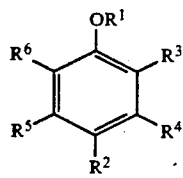
(I)

in a silver halide emulsion layer or in an adjacent light-insensitive layer of binder.

In the above formula (I), $R^1$ denotes H, a group which can be split of f under alkaline conditions or alkyl or aryl;

$R^2$ denotes OH, alkyl, aryl, alkoxy or

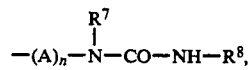

$R^3$, $R^4$, $R^5$ and $R^6$ denote H, OH, COOH, $SO_3H$, $SO_2H$, alkyl, aryl, alkoxy, alkylsulphonyl, arylsulphonyl, sulphamoyl optionally substituted, e.g. by alkyl and/or aryl, acylamino or

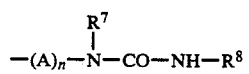

and at least one of the groups $R^2$, $R^3$, $R^4$, $R^5$ and $R^6$ is a group of the formula

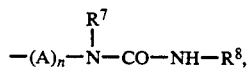

A denotes an alkylene group having 1-6 carbon atoms, n stands for 0 or 1, $R^7$ denotes H or an alkyl group optionally substituted, for example with COOH or $SO_3H$, e.g. carboxymethyl, and $R^8$ denotes the residue of a polymer produced by polycondensation, in particular a polyester, polyether, polycarbonate, polyurethane or polyester polyurethane;

$R^1$ and $R^3$ may form a 5-membered or 6-membered ring, in which case $R^2$=OH or alkoxy, and $R^2$ and $R^4$ may form a 5-membered or 6-membered carbocyclic ring.

A group denoted by $R^1$ which can be split off under alkaline conditions may be, for example, an acyl group derived from aliphatic or aromatic carboxylic acids. Examples of such groups which can be split off under alkaline conditions include acetyl, dichloroacetyl, alkoxycarbonyl and pyruvoyl.

An alkyl group denoted by $R^2$ to $R^6$ preferably has 1 to 4 carbon atoms. Examples include methyl, ethyl, propyl, iso-propyl, butyl and t-butyl. An aryl group denoted by $R^2$ to $R^6$ contains 6 to 10 carbon atoms; examples include phenyl and naphthyl. The alkyl and aryl groups may be further substituted, e.g. with halogen or alkyl. An alkoxy group denoted by $R^2$ to $R^6$ may contain 1 to 18 carbon atoms. The acyl group in an acylamino group denoted by $R^2$ to $R^6$ is derived from aliphatic or aromatic carboxylic or sulphonic acids.

Examples of stabilizers according to the invention are given below.

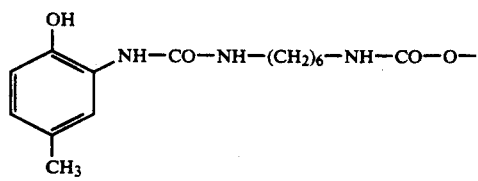
[Polyester adipic acid and 1,4-butanediol]  S-1
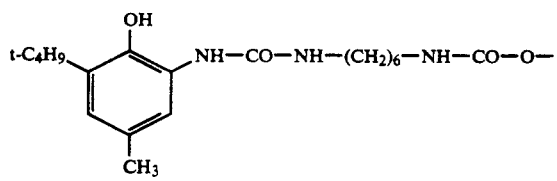
[Polyester of phthalic acid, adipic acid and ethylene glycol]  S-2
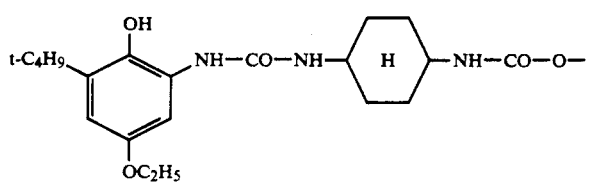
[Polytetrahydrofuran]  S-3
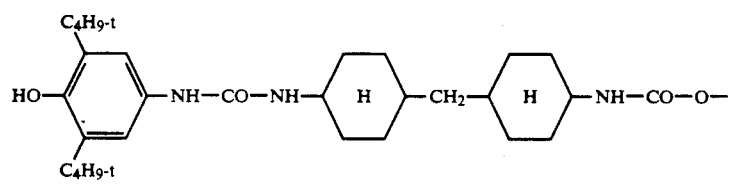
[Polypropylene oxide]  S-4
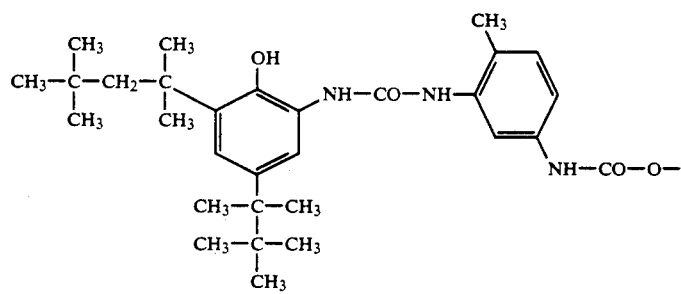
[Polyester of glutaric acid and butanediol]  S-5
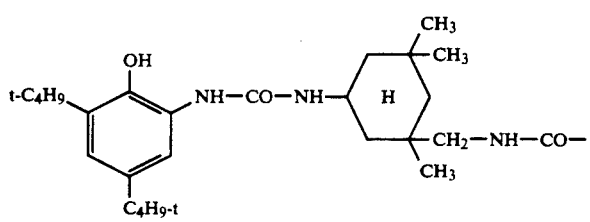
[Polyester of adipic acid and butanediol-/neopentyl glycol]  S-6
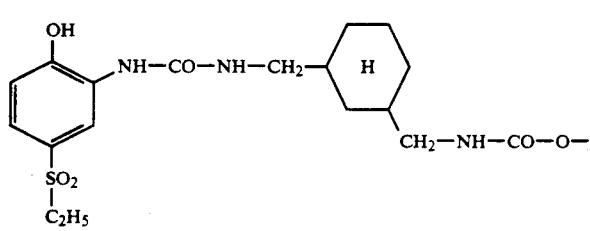
[Polyester of adipic acid/terePhthalic acid 1:1 and butane diol]  S-7

-continued

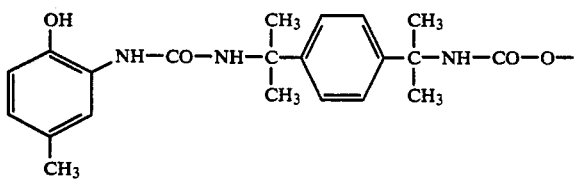
Polyester of adipic acid and propanediol   S-8

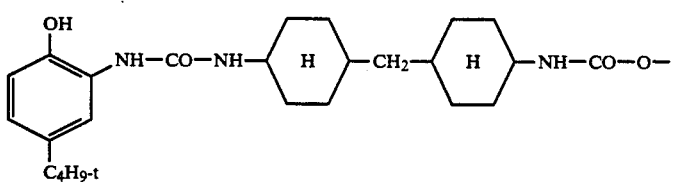
Polyester of succinic acid and butanediol   S-9

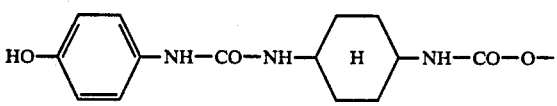
Polyester of maleic acid and butanediol   S-10

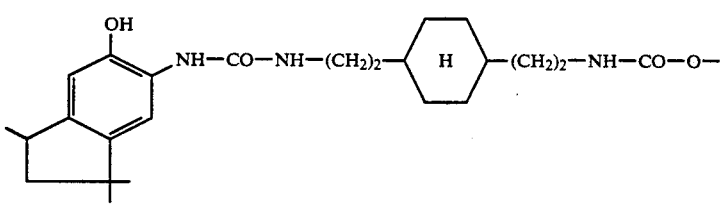
Polyester of adipic acid and neopentyl glycol/ethylene glycol   S-11

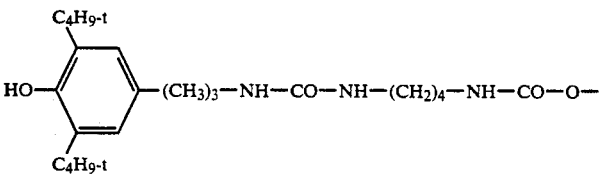
Polyester of adipic acid and neopentyl glycol   S-12

The compounds according to the invention may easily be prepared by the reaction of amines corresponding to Formula II (starting compound 1) with polymeric mono-, di- or polyisocyanates (Starting compound 2).

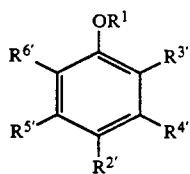 (II)

In Formula II, $R^1$, A and n have the meanings indicated for Formula I;

$R^{2'}$ stands for OH, alkyl, aryl, alkoxy or $(A)_n$—$NH_2$;

$R^{3'}$, $R^{4'}$, $R^{5'}$ and $R^{6'}$ stand for H, OH, COOH, $SO_3H$, $SO_2H$, alkyl, aryl, alkoxy, alkylsulphonyl, arylsulphonyl, sulphamoyl optionally substituted by alkyl and/or aryl, acylamino or $(A)_n$—$NH_2$, under the condition that at least one of the groups $R^{2'}$, $R^{3'}$, $R^{4'}$, $R^{5'}$ and $R^{6'}$ is $(A)_n$—$NH_2$.

The polymeric isocyanates (hereinafter referred to as isocyanate prepolymers) may be polymers containing isocyanate groups obtained by the reaction of compounds containing active hydrogen atoms with di- or polyisocyanates. The compounds containing active hydrogen atoms are mainly linear and have a molecular weight of about 300 to 10,000, preferably from 500 to 4,000. These compounds which are known per se have hydroxyl and/or amino end groups. Polyhydroxyl compounds such as polyesters, polyacetals, polyethers, polyamides, polyester amides and polycarbonates are preferred. The hydroxyl number of these compounds is therefore about 370 to 10, in particular from 225 to 28.

Examples of suitable polyethers include the polymerisation products of ethylene oxide, propylene oxide, tetrahydrofuran, butylene oxide and their copolymerisation or graft polymerisation products as well as condensates obtained by the condensation of polyhydric alcohols or mixtures thereof and the products obtained by the alkoxylation of polyhydric alcohols.

The compounds obtainable from hexanediol and formaldehyde are examples of suitable polyacetals. The polyesters, polyesteramides and polyamides may be the predominantly linear condensates obtained from polybasic saturated or unsaturated carboxylic acids and polyvalent saturated alcohols, amino alcohols, diamines or mixtures thereof.

Polyhydroxyl compounds already containing urethane or urea groups may also be used.

Mixtures of various polyhydroxyl compounds may, of course, be used to vary the lyophilic or hydrophobic properties and mechanical properties of the products of the process.

The polyisocyanates used for the preparation of the polymers containing isocyanate groups may be any aromatic or aliphatic diisocyanates or triisocyanates, e.g. 1,5-naphthylene diisocyanate, 4,4'-diphenylmethane diisocyanate, 4,4'-diphenyldimethylmethane diisocyanate, di- and tetraalkyl diphenylmethane diisocyanate, 4,4'-dibenzyldiisocyanate, 1,3-phenylene diisocyanate, 1,4-phenylene diisocyanate, the isomers of tolylene diisocyanate optionally as mixtures, preferably aliphatic diisocyanates such as butane-1,4-diisocyanate, hexane-1,6-diisocyanate, dicyclohexylmethane diisocyanate, cyclohexane-1,4-diisocyanate and isopharone diisocyanate, biuret triisocyanate, 2,4-bis-(4-isocyanatobenzyl)-1-isocyanatobenezene, tris-(4-isocyanatophenyl)-methane and 2-ethyl-1,2, 3-tris-(3-isocyanato-4-methyl-anilinocarbonyloxy)-propane.

The isocyanate prepolymers may be prepared by the methods described in Houben-Weyl, Volume 205, pages 1613 et seq (Georg Thieme Verlag, Stuttgart, N.Y. 1987).

The isocyanate prepolymers or the polymers produced by polycondensation, the residues of which are denoted by $R^8$, preferably contain in their chain urethane groups and/or urea groups which have been formed by reaction of the compounds containing active hydrogen atoms with polyisocyanates.

Preparation of Compound S-1

136 g of an isocyanate prepolymer having an NCO content of 0.1 mol obtained from a polyesterdiol of adipic acid and 1,4-butanediol by a reaction with hexamethylene diisocyanate are dissolved in 200 g of acetone, and 12.3 g of 2-hydroxy-5-methylaniline are added at 30° C. with stirring. After a further 4 hours' stirring at 50° C., the acetone is distilled off in a rotary evaporator and the residue is dissolved in ethyl acetate, extracted with water and dehydrated with $Na_2SO_4$. A viscous, clear solution having a solids content of 35% by weight is obtained. The yield is 82%. Compounds S-2 to S-12 are prepared similarly, using the starting compounds shown in Table 1.

TABLE 1

| Compound | Starting Compound 1 | Starting Compound 2 |
|---|---|---|
| S-1 | 2-hydroxy-5-methylaniline (OH, NH₂, CH₃ on benzene) | Isocyanate prepolymer: Polyester of adipic acid and butanediol reacted with hexamethylene diisocyanate |
| S-2 | t-C₄H₉, OH, NH₂, CH₃ on benzene | Isocyanate prepolymer: Polyester of phthalic acid, adipic acid and ethylene glycol reacted with hexamethylene diisocyanate |
| S-3 | t-C₄H₉, OH, NH₂, OC₂H₅ on benzene | Isocyanate prepolymer: Polytetrahydrofuran reacted with trans-1,4-bis-(isocyanato)-cyclohexane, |
| S-4 | t-C₄H₉, OH, C₄H₉-t, NH₂ on benzene | Isocyanate prepolymer of polypropylene oxide and bis-(4-isocyanato-cyclohexyl)-methane |
| S-5 | di-t-alkyl-substituted OH, NH₂ on benzene | Isocyanate prepolymer: Polyester of glutaric acid and butanediol reacted with 2,4-bis-(isocyanato)-toluene |

TABLE 1-continued

| Compound | Starting Compound 1 | Starting Compound 2 |
|---|---|---|
| S-6 | 2-amino-4,6-di-tert-butylphenol (OH, NH₂, t-C₄H₉, C₄H₉-t on benzene ring) | Isocyanate prepolymer: Polyester of adipic acid, butanediol and neopentyl glycol reacted with isophorone diisocyanate |
| S-7 | 2-amino-4-(ethylsulfonyl)phenol (OH, NH₂, SO₂C₂H₅ on benzene ring) | Isocyanate prepolymer: Polyeser of adipic acid, terephthalic acid (1:1) and butanediol reacted with 1,3-bis-(isocyanatomethyl)-cyclohexane |
| S-8 | 2-amino-4-methylphenol (OH, NH₂, CH₃ on benzene ring) | Isocyanate prepolymer: Polyester of adipic acid and propanediol reacted with 1,4-bis-(1-isocyanato-1-methyl-ethyl)-benzene |
| S-9 | 2-amino-4-tert-butylphenol (OH, NH₂, C₄H₉-t on benzene ring) | Isocyanate prepolymer: Polyester of succinic acid and butanediol reacted with bis-(4-isocyanato-cyclohexyl)-methane |
| S-10 | 4-aminophenol (OH, NH₂ on benzene ring) | Isocyanate prepolymer: Polyester of maleic acid and butanediol reacted with trans-1,4-bis-(isocyanato)-cyclohexane |
| S-11 | indane-substituted aminophenol (OH, NH₂ on benzene ring fused to dimethyl indane) | Isocyanate prepolymer: Polyester of adipic acid, neopentyl glycol and ethylene glycol reacted with 1,4-bis-(2-isocyanatoethyl)-cyclohexane |
| S-12 | 2,6-di-tert-butyl-4-(1-aminoethyl)phenol (OH, t-C₄H₉, C₄H₉-t, (CH)₃-NH₂ on benzene ring) | Isocyanate prepolymer: Polyester of adipic acid and neopentyl glycol reacted with butane-1,4-diisocyanate |

The colour photographic recording material according to the invention contains at least one light-sensitive silver halide emulsion layer and preferably a sequence of several such light-sensitive silver halide emulsion layers and optionally also auxiliary layers, in particular protective layers, and light-insensitive layers of binders arranged between the light-sensitive layers. According to the present invention, a compound according to the invention in combination with a colour coupler, preferably a magenta coupler, in particular of the type of pyrazolo-azole couplers, or a yellow coupler is associated with at least one of the light-sensitive silver halide emulsion layers present.

The compounds according to the invention function primarily as light stabilizers, i.e. the dyes obtained from the colour couplers by chromogenic development, generally azomethine dyes, have considerably greater stability against the action of light in the presence of the compounds according to the invention. Further, the compounds according to the invention also improve the stability of the dye against the action of moisture and heat and they act as softening agents. In addition, the compounds according to the invention assume the function of an oil former for the colour couplers, i.e. they may be used as coupler solvents, either alone or together with other known oil formers. In the latter case, the compounds according to the invention preferably amount to at least 50% by weight of the total quantity of oil former in the layer in which they are contained. The fact that no other oil formers are required advantageously reduces the amount of substance in the layer and/or the total layer thickness of the recording materials according to the invention.

In the course of preparation of the compounds according to the invention (reaction of the compounds containing active hydrogen atoms with polyisocyanates), the compounds are generally obtained as solutions in aprotic (hydrophobic) solvents, e.g. ethyl acetate, and may be directly used in the form of these solutions for incorporation in the casting solution for the particular layer, optionally together with the given colour coupler. Incorporation of the compounds according to the invention is carried out in the usual manner, optionally using auxiliary solvents and/or high boiling coupler solvents, so-called oil formers, but the latter are preferably only used in minor quantities.

The silver halide present as light-sensitive component in the photographic recording material according to the invention may contain halide in the form of chloride, bromide or iodide or mixtures thereof. For example, the halide content of at least one layer may comprise from 0 to 15 mol-% of iodide, form 0 to 100 mol-% of chloride and from 0 to 100 mol-% of bromide.

Silver iodobromide emulsions are normally used for colour negative and colour reversal films, and silver chlorobromide emulsions having a high chloride content, up to pure silver chloride emulsions, are normally used for colour negative and colour reversal paper. The halides may consist predominantly of compact crystals which may, for example, have a regular cubical or octahedral form or transitional forms, but platelet shaped crystals may also advantageously be present. The average ratio of diameter to thickness of these platelets is preferably at least 5:1, the diameter of a grain being defined as the diameter of a circle having the same surface area as the projected surface of the grain. The layers may also contain tabular silver halide crystals in which the ratio of diameter to thickness is substantially greater than 5:1, e.g. from 12:1 to 30:1.

The silver halide grains may also have a multilayered grain structure; in the simplest case this may consist of an inner and an outer grain region (core/shell) which may differ from one another in their halide composition and/or by other modifications, e.g. doping of the individual regions of the grain. The average grain size of the emulsions is preferably from 0.2 μm to 2.0 μm and the grain size distribution may be either homodisperse or heterodisperse. A homodisperse grain size distribution means that 95% of the grains differ by not more than ±30% from the average grain size.

In addition to containing silver halide, the emulsions may contain other silver salts, e.g. organic silver salts such as silver benzotriazolate or silver behenate.

Two or more types of silver halide emulsions which have been prepared separately may be used as mixtures.

The emulsions may be chemically or spectrally sensitized in the usual manner and they may also be stabilized by means of suitable additives. Suitable chemical sensitizers, spectral sensitizing dyes and stabilizers are described, for example, in Research Disclosure 17643 (Dec. 1978); see in particular Chapters III, IV and VI.

The colour photographic recording material according to the invention preferably contains at least one light recording silver halide emulsion layer for each of the three spectral regions, red, green and blue. The light-sensitive layers are spectrally sensitized with suitable sensitizing dyes for this purpose in known manner.

A survey of the polymethine dyes suitable as spectral sensitizers, suitable combinations thereof and combinations which have a supersensitizing action is given in Research Disclosure 17643 (Dec. 1978), Chapter IV.

The following dyes in particular are suitable (given in the order of the spectral regions):
1. As red sensitizers 9-Ethylcarbocyanines having benzothiazole, benzoselenazole or naphthothiazole as basic end groups and optionally substituted in the 5- and/or 6-position by halogen, methyl, methoxy, carbalkoxy or aryl groups; and 9-ethyl-naphthoxathia- or -selenocarbocyanines and 9-ethyl-naphthothiaoxa- or -benzimidazole-carbocyanines, provided the dyes carry at least one sulphoalkyl group on the heterocyclic nitrogen. 2. As green sensitizers 9-Ethylcarbocyanines having benzoxazole, naphthoxazole or one benzoxazole and one benzothiazole as basic end groups and benzimidazocarbocyanines which may be further substituted and must also contain at least one sulphoalkyl group on the heterocyclic nitrogen atom.
3. As blue sensitizers Symmetric or asymmetric benzimidazo-, oxa-, thiaor selenacyanines having at least one sulphoalkyl group on the heterocyclic nitrogen atom and optionally other substituents on the aromatic nucleus, and apomerocyanines containing a rhodanine group.

The following red sensitizers RS, green sensitizers GS and blue sensitizers BS are given as examples, in particular for negative and reversal films. These sensitizers may be used singly or in combination with one another, e.g. RS-1 with RS-2 or GS-1 with GS-2.

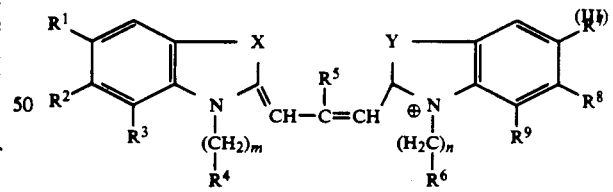

RS-1: $R^1, R^3, R^7, R^9 = H$; $R^2, R^8 = Cl$; $R^4 = SO_3^{\ominus} \oplus NH(C_2H_5)_3$; $R^5 = C_2H_5$; $R^6 = SO_3^{\ominus}$; m,n = 3; X,Y = S;

RS-2: $R^1, R^3, R^9 = H$; $R^2 =$ phenyl; $R^4 =$

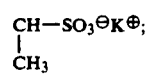

$R^5 = -C_2H_5$; $R^6 = SO_3^{63}$; $R^7, R^8 = OCH_3$; m = 2; n = 3; X = O; Y = S;

RS-3: $R^1, R^9 = H$; $R^2$ and $R^3$ together $= CH = CH - CH = CH$; $R^4 = SO_3^{63}$ $Na^{\oplus}$; $R^5 = C_2H_5$; $R^6 = SO_3^{\ominus}$; $R^7, R^8 = cl$; m,n = 3; X = S; Y = N - C_2H_5$;

RS-4: $R^1=OCH_3$; $R^2,R^8=CH_3$; $R^3,R^4,R^7,R^9=H$; $R^5=C_2H_5$; $R^6=SO_3^{\ominus}$; m=2; n=4; X=S; Y=Se;

RS-5: $R^1,R^7=H$; $R^2$ and $R^3$ together and $R^8$ and $R^9$ together —CH=CH—CH=CH; $R^4=SO_3^{\ominus}\oplus NH(C_2H_5)_3$; $R^5=C_2H_5$; $R^6=SO_3^{\ominus}$; m=2; n=3; X,Y=S;

GS-1: $R^1,R^3,R^7,R^9=H$; $R^2=$phenyl; $R^4=$

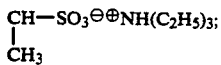

$R^5=C_2H_5$; $R^6=SO_3^{\ominus}R^8=Cl$; m=2; n=3; X,Y=O;

GS-2: $R^1,R^2,R^7,R^8=Cl$; $R^3,R^5,R^6,R^9=H$;

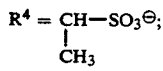

m,n=2; X,Y=N—$C_2H_5$;

GS-3: $R^1,R^7=H$; $R^2$ and $R^3$ together and $R^8$ and $R^9$ together =CH=CH—CH=CH; $R^4=SO_3^{\ominus}Na^{\oplus}$; $R^5=C_2H_5$; $R^6=SO_3^{\ominus}$; m,n=3; X,Y=O;

GS-4: $R^1,R^3,R^4,R^7,R^8,R^9=H$; $R^2=OCH_3$; $R^5=C_2H_5$; $R^6=SO_3^{\ominus}$; m=2; n=4; X=O; Y=S;

BS-1:

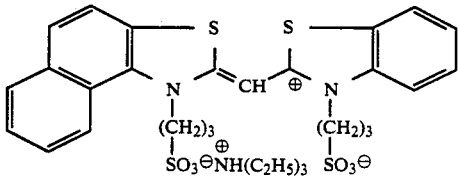

BS-2:

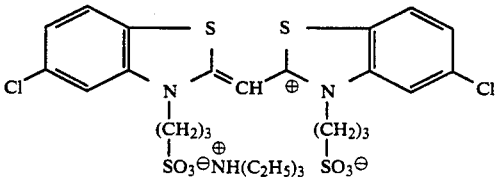

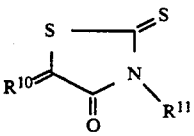

BS-3:

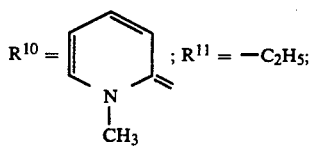

BS-4:

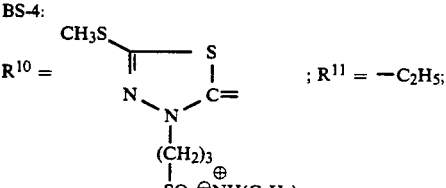

BS-5:

-continued

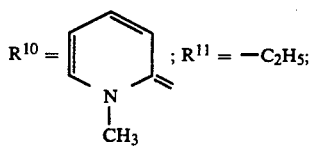

Sensitizers may be omitted if the intrinsic sensitivity of the silver halide is sufficient for a particular spectral region, for example the blue sensitivity of silver bromides.

Each of the above-mentioned light sensitive layers may consist of a single layer or it may consist in known manner of two or more silver halide emulsion partial layers, as for example in the so-called double-layer arrangement (DE-C-1 121 470). In negative films, red-sensitive silver halide emulsions are generally arranged closer to the layer support than green-sensitive silver halide emulsion layers, which in turn are arranged closer to the support than blue-sensitive silver halide emulsion layers, and a light-insensitive yellow filter layer is generally situated between the green-sensitive layers and the blue-sensitive layers, but other arrangements could also be used, e.g. in colour paper. A light-insensitive interlayer which may contain agents for preventing accidental diffusion of developer oxidation products is generally arranged between layers differing in spectral sensitivity. When a material contains several silver halide emulsion layers of the same spectral sensitivity, these may either be arranged directly adjacent to one another or separated by a light-sensitive layer of a different spectral sensitivity (DE-A- 1 958 709, DE-A-2 530 645, DE-A-2 622 922).

Colour photographic recording materials according to the invention generally contain colour couplers for producing the various partial colour images in cyan, magenta and yellow in spatial and spectral association with the silver halide emulsion layers of the different spectral sensitivities. The compounds according to the invention together with the corresponding colour coupler are preferably associated with a green-sensitive silver halide emulsion layer and/or a blue-sensitive silver halide emulsion layer.

By "spatial association" is meant that the colour coupler is in such spatial relationship to the silver halide emulsion layer that the coupler and the layer can interact to produce an imagewise correspondence between the silver image obtained from development and the colour image produced from the colour coupler. This is generally achieved by introducing the colour coupler into the silver halide emulsion layer itself or into an adjacent, optionally light insensitive layer of binder.

By "spectral association" is meant that the spectral sensitivity of each of the light-sensitive silver halide emulsion layers and the colour of the partial colour image produced from the spatially associated colour coupler stand in a certain relationship to one another, each of the spectral sensitivities (red, green, blue) being associated with a different colour of the partial colour image (in general, for example, the colours cyan, magenta and yellow, in this sequence).

One or more colour couplers may be associated with each of the spectrally differently sensitized silver halide emulsion layers. When a material contains several silver halide emulsion layers of the same spectral sensitivity, each of these layers may contain a colour coupler but these colour couplers need not necessarily be identical, provided only that they all give rise to at least approximately the same colour as a result of colour development, normally a colour which is complementary to the colour of the light for which the given silver halide emulsion layers have the predominant sensitivity.

Colour couplers for producing the cyan partial colour image are generally couplers of the phenol or α-naphthol series; the following are suitable examples of these:

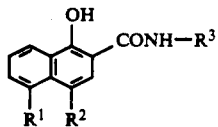 (IV)

C-1:

$R^1, R^2 = H; R^3 = -(CH_2)_3-O-$ 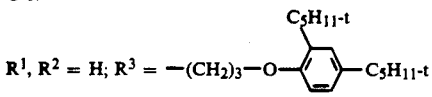

C-2:
$R^1 = -NHCOOCH_2-CH(CH_2)_2; R^2 = H;$ $R^3 = -(CH_2)_4-O-$ 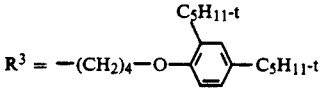

C-3:
$R^1 = H; R^2 = -OCH_2-CH_2-SO_2CH_3; R^3 = -C_{16}H_{33}$

C-4:
$R^1 = H; R^2 = -OCH_2-CONH-(CH_2)_2-OCH_3;$ $R^3 = -(CH_2)_4-O-$ 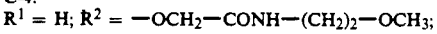

C-5:

$R^1, R^2 = H; R^3 = -(CH_2)_4-O-$ 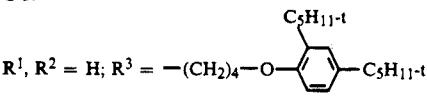

C-6:

$R^1, R^2 = H; R^3 = -(CH_2)_4-O-$ 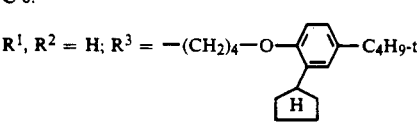

C-7:
$R^1 = H; R^2 = Cl; R^3 = -C(C_2H_5)_2-C_{21}H_{43}$

C-8:
$R^1 = H;$
$R^2 = -O-CH_2-CH_2-S-CH(COOH)-C_{12}H_{25}$
$R^3 = $ Cyclohexyl

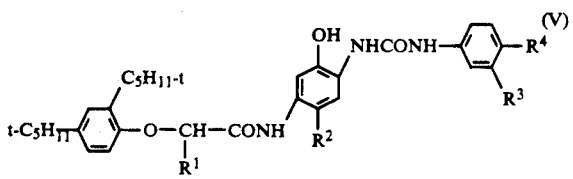 (V)

C-9:
$R^1 = -C_4H_9; R^2 = H; R^3 = -CN; R^4 = Cl$

C-10:
$R^1 = -C_4H_9; R^2 = H; R^3 = H; R^4 = -SO_2CHF_2$

-continued

C-11:
$R^1 = -C_4H_9;$ $R^2 = -O-$  $-C(CH_3)_2-CH_2-C(CH_3)_3;$ $R^3 = H; R^4 = -CN$

C-12:
$R^1 = C_2H_5; R^2, R^3 = H; R^4 = -SO_2CH_3$

C-13:
$R^1 = -C_4H_9; R^2, R^3 = H; R^4 = -SO_2-C_4H_9$

C-14:
$R^1 = -C_4H_9; R^2 = H; R^3 = -CN; R^4 = -CN$

C-15:
$R^1 = -C_4H_9; R^2, R^3 = H; R^4 = -SO_2-CH_2-CHF_2$

C-16:
$R^1 = -C_2H_5; R^2, R^3 = H;$
$R^4 = -SO_2CH_2-CHF-C_3H_7$

C-17:
$R^1 = -C_4H_9; R^2, R^3 = H; R^4 = F$

C-18:
$R^1 = -C_4H_9; R^2, R^3 = H; R^4 = -SO_2CH_3$

C-19:
$R^1 = -C_4H_9; R^2, R^3 = H; R^4 = -CN$

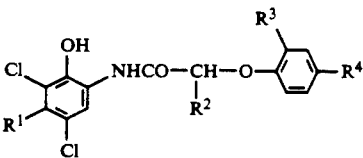 (VI)

C-20:
$R^1 = -CH_3; R^2 = -C_2H_5; R^3, R^4 = -C_5H_{11}-t$

C-21:
$R^1 = -CH_3; R^2 = H; R^3, R^4 = -C_5H_{11}-t$

C-22:
$R^1, R^2 = -C_2H_5; R^3, R^4 = -C_5H_{11}-t$

C-23:
$R^1 = -C_2H_5; R^2 = -C_4H_9; R^3, R^4 = -C_5H_{11}-t$

C-24:
$R^1 = -C_2H_5; R^2 = -C_4H_9; R^3, R^4 = -C_4H_9-t$

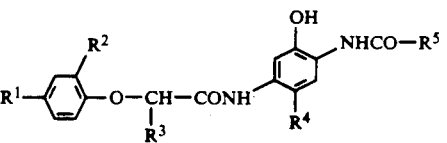 (VII)

C-25:
$R^1, R^2 = -C_5H_{11}-t; R^3 = -C_4H_9; R^4 = H; R^5 = -C_3F_7$

C-26:
$R^1 = -NHSO_2-C_4H_9; R^2 = H; R^3 = -C_{12}H_{25};$
$R^4 = Cl; R^5 = $ Phenyl C-27:
$R^1, R^2 = -C_5H_{11}-t; R^3 = -C_3H_7-i;$
$R^4 = Cl; R^5 = $ pentafluorophenyl C-28:
$R^1 = -C_5H_{11}-t; R^2 = Cl; R^3 = -C_6H_{13};$
$R^4 = Cl; R^5 = $ -2-chlorophenyl Colour couplers for producing the magenta partial colour image are generally couplers of the 5-pyrazolone, indazolone or pyrazoloazole series. The following are suitable examples of these:
(VIII)
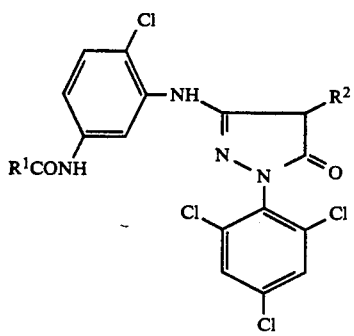
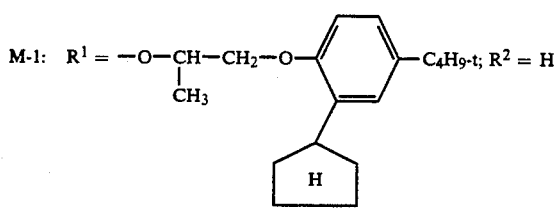
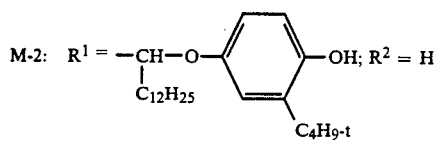
M-3: $R^1 = -C_{13}H_{27}$; $R^2 = H$
M-4: $R^1 = -OC_{16}H_{33}$; $R^2 = H$
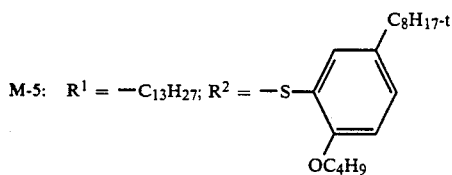
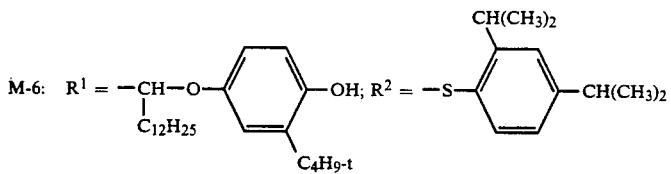
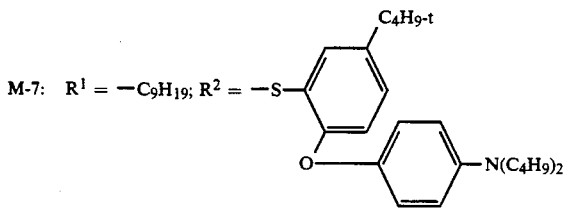
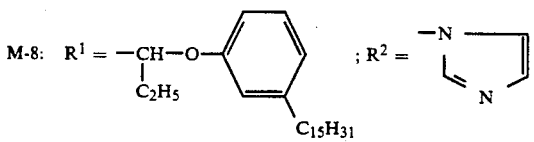

M-9: 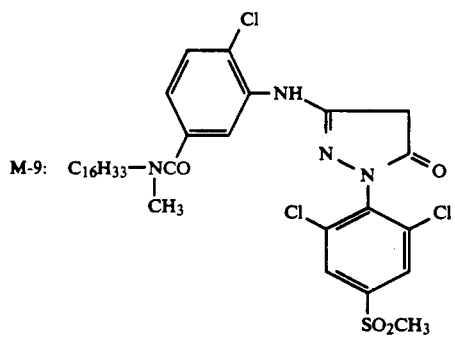
M-10: 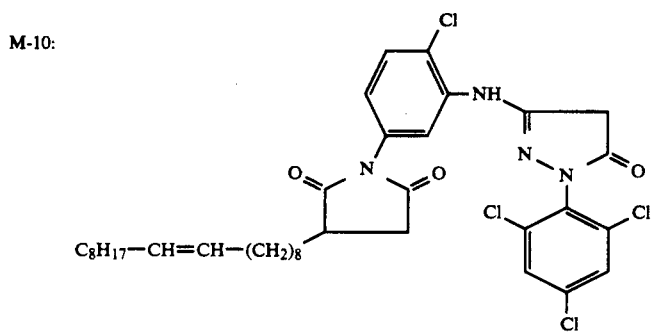
(IX)
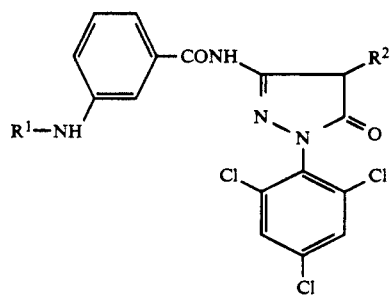
M-11: 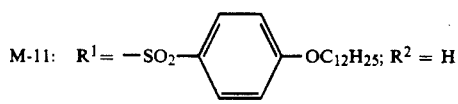
M-12: 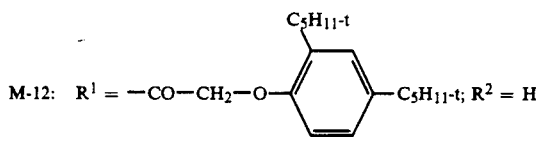
M-13: 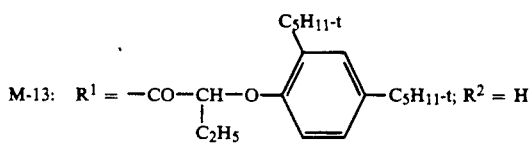
M-14: 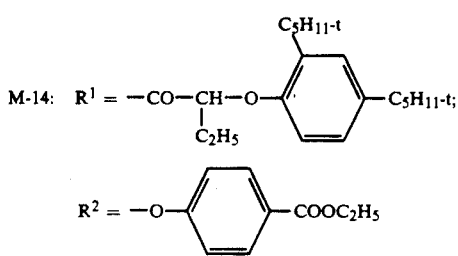

-continued
M-15: 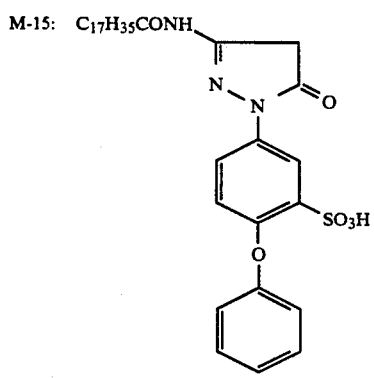
M-16: 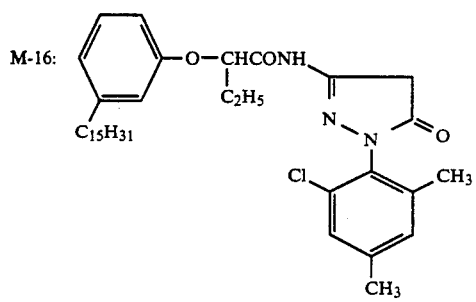
M-17: 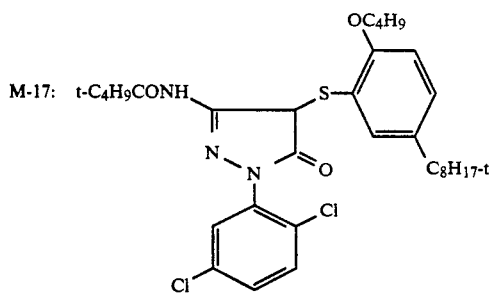
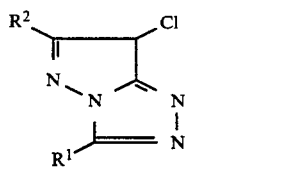 (Xa)
M-18: $R^1 = $ 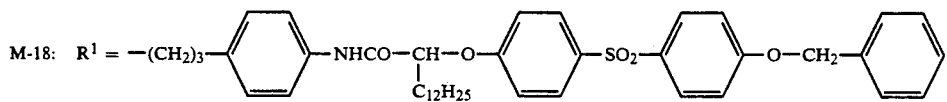
$R^2 = -CH_3$
M-19: $R^1 = $ 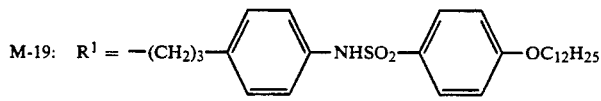
$R^2 = -CH_3$ M-20: $R^1 =$ 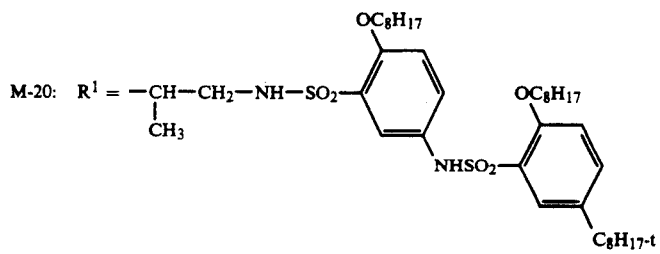
$R^2 = -C_4H_9\text{-}t$
M-21: $R^1 =$ 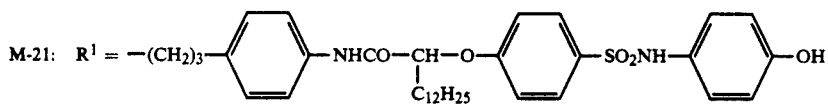
$R^2 = -CH_3$
M-22: $R^1 =$ 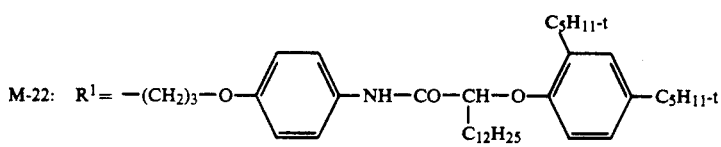
$R^2 = -CH_3$
M-23: $R^1 =$ 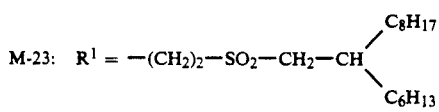
$R^2 = -CH_3$
M-24: $R^1 =$ 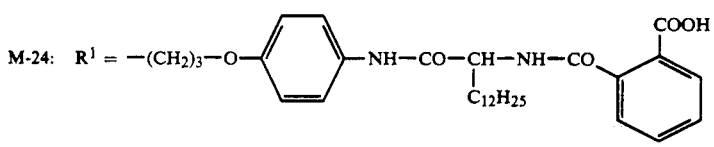
$R^2 = -CH_3$
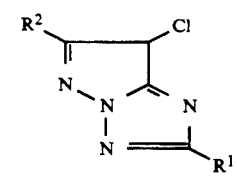
(XIa)
M-25: $R^1 =$ 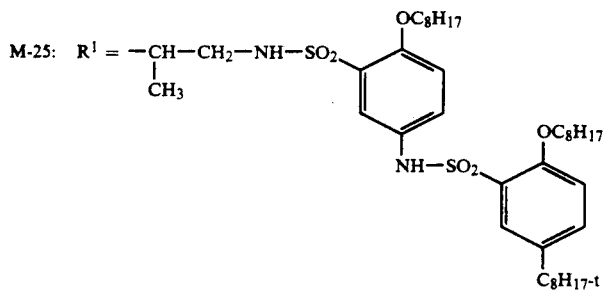
$R^2 = -CH_3$ M-26: $R^1 = $ 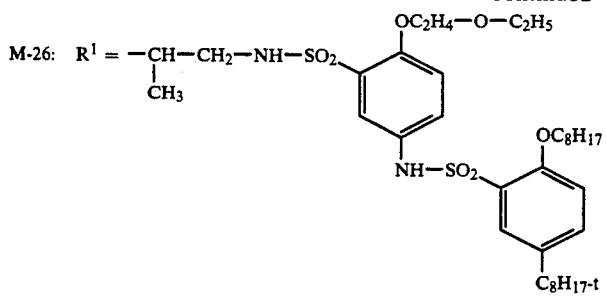

$R^2 = -CH_3$

M-27: $R^1 = $ 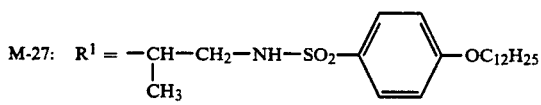

$R^2 = -C_3H_7\text{-i}$

M-28: $R^1 = $ 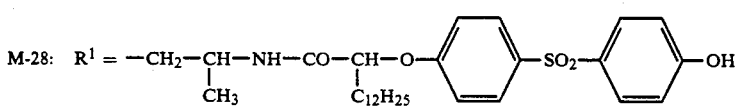

$R^2 = -CH_3$

M-29: $R^1 = -C_3H_7\text{-i}$ $R^2 = $ 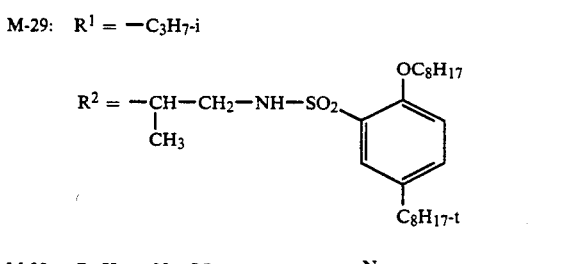

M-30: 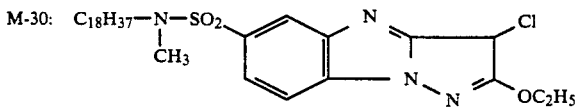

Pyrazoloazo couplers corresponding to the general formulae X and XI

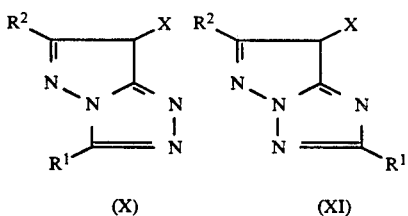

are described, for example, in US-A-3 725 067 and US-A-4 540 654. In Formulae X and XI X denotes H or a group which is releasable under the conditions of colour development; and $R^1$ and $R^2$ denote H, alkyl, aralkyl, aryl, alkoxy, aroxy, alkylthio, arylthio, amino, anilino, acylamino, cyano, alkoxycarbonyl, carbamoyl or sulphamoyl; these groups may be further substituted.

Colour couplers for producing the yellow partial colour image are generally couplers having an open chain ketomethylene group, in particular couplers of the α-acylacetamide series; suitable examples of these include α-benzoylacetanilide couplers and α-pivaloylacetanilide couplers corresponding to the following formulae:

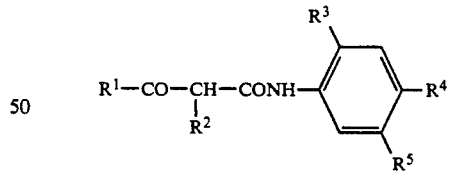

Y-1:
$R^1 = -C_4H_9\text{-t}$;

$R^2 = $ 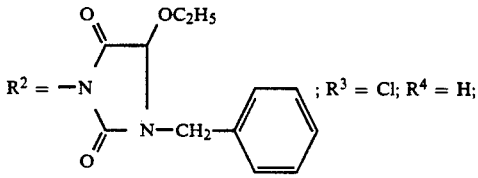 ; $R^3 = Cl$; $R^4 = H$;

$R^5 = $ —NHCO—CH—O— (with $C_2H_5$ branch, and aryl group with $C_5H_{11}\text{-t}$ substituents)

Y-2:
R¹ = —C₄H₉-t;
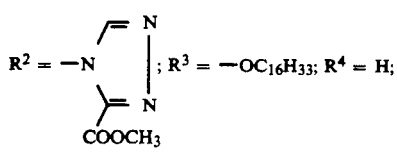
; R³ = —OC₁₆H₃₃; R⁴ = H;
R⁵ = —SO₂NHCH₃
Y-3:
R¹ = —C₄H₉-t;
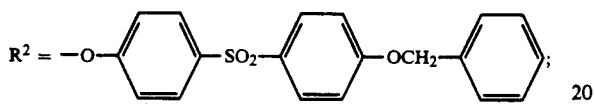
R³ = Cl
R⁴ = H; R⁵ = —NHSO₂—C₁₆H₃₃
Y-4:
R¹ = —C₄H₉-t;
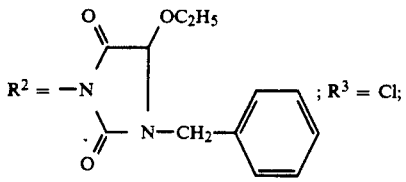
; R³ = Cl;
R⁴ = H; R⁵ = —COOC₁₂H₂₅
Y-5:
R¹ = —C₄H₉-t;
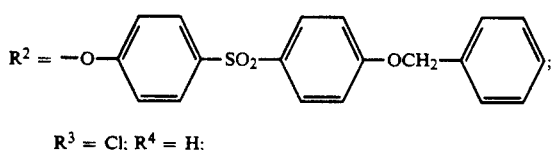
R³ = Cl; R⁴ = H;
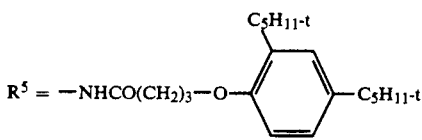
Y-6:
R¹ = —C₄H₉-t;
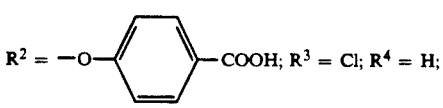
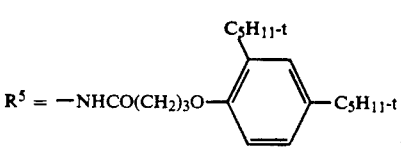
Y-7:
R¹ = —C₄H₉-t;
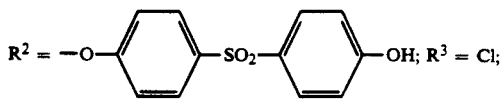
R² = —O—⟨⟩—SO₂—⟨⟩—OH; R³ = Cl;
R⁴ = H; R⁵ = —NHSO₂—C₁₆H₃₃
Y-8:
R¹ = —C₄H₉-t;
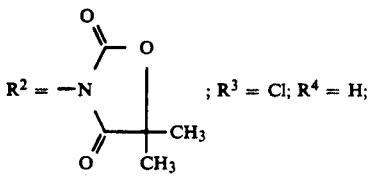
; R³ = Cl; R⁴ = H;
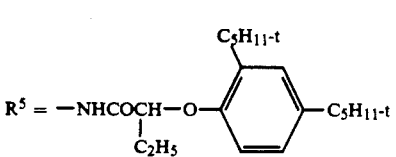
Y-9:
R¹ = —C₄H₉-t;
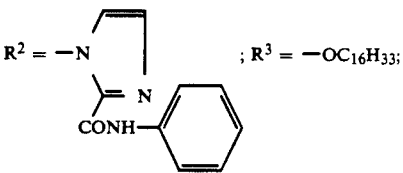
; R³ = —OC₁₆H₃₃;
R⁴ = H; R⁵ = —SO₂NHCOC₂H₅
Y-10:
R¹ = —C₄H₉-t;
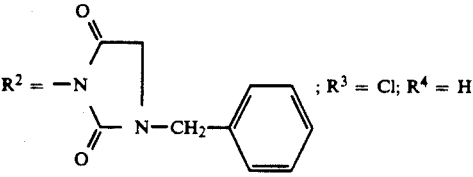
; R³ = Cl; R⁴ = H
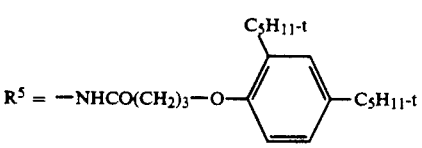
Y-11:
R¹ = —C₄H₉-t;
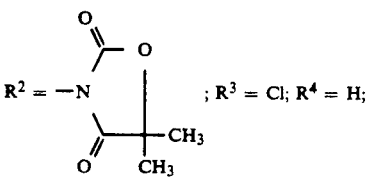
; R³ = Cl; R⁴ = H;
R⁵ = —COOCH—COOC₁₂H₂₅
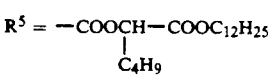
Y-12:
R¹ = —C₄H₉-t;

$R^2 = $ [N-vinyl-imidazole with CONHC$_6$H$_{13}$]; $R^3 = Cl$; $R^4 = H$;

$R^5 = -NHCO(CH_2)_3-O-$[2,4-di-t-C$_5$H$_{11}$-phenyl]

Y-13:
$R^1 = -C_4H_9\text{-}t$;

$R^2 = -N$[maleimide-type ring with COOCH$_3$]; $R^3 = -OC_{16}H_{33}$; $R^4 = H$;

$R^5 = -SO_2NHCH_3$

Y-14:
$R^1 = -C_4H_9\text{-}t$;

$R^2 = -N$[maleimide-type ring with COOCH$_3$];

$R^3 = Cl$; $R^4 = H$;

$R^5 = -NHCO(CH_2)_3-O-$[2,4-di-t-C$_5$H$_{11}$-phenyl]

Y-15:

$R^1 = t\text{-}C_5H_{11}-$[phenyl with C$_5$H$_{11}$-t]$-O-\underset{\underset{C_2H_5}{|}}{CH}-CONH-$[m-tolyl];

$R^2, R^4, R^5 = H$; $R^3 = -OCH_3$

Y-16:

$R^1 = -$[phenyl]$-OC_{16}H_{33}$; $R^2 = -N$[imidazo-pyrimidinedione with N-CH$_3$, N-CH$_3$]

$R^3, R^5 = -OCH_3$; $R^4 = H$

Y-17:

$R^1 = -$[phenyl]$-OCH_3$; $R^2 = -N$[ring with OC$_2$H$_5$, CH$_3$, N-CH$_2$-phenyl]

$R^3 = Cl$; $R^4 = H$; $R^5 = -COOC_{12}H_{25}$

Y-18:

$R^1 = -$[phenyl]$-OC_{16}H_{33}$; $R^2 = -N$[imidazo-pyrimidinedione with N-CH$_3$, N-CH$_3$]

$R^3 = Cl$; $R^4, R^5 = -OCH_3$

Y-19:

$R^1 = -$[phenyl]$-OC_{16}H_{33}$; $R^2 = -N$[imidazoline with CONH-phenyl]

$R^3 = -OCH_3$; $R^4 = H$; $R^5 = -SO_2N(CH_3)_2$

Y-20:

$R^1 = -$[phenyl]$-OCH_3$;

$R^2 = -N$[maleimide-type ring with CO$_2$-CH$_2$-CH(CH$_3$)$_2$];

$R^3 = -OCH_3$; $R^4 = H$;

$R^5 = -NHCO(CH_2)_3O-$[2,4-di-t-C$_5$H$_{11}$-phenyl]

Y-21:

[2,4-dimethoxyphenyl]$-CO-\underset{\underset{\text{[theophylline-N]}}{|}}{CH}-CONH-$[phenyl with OC$_2$H$_5$, OC$_2$H$_5$, SO$_2$N(CH$_3$)C$_{18}$H$_{37}$]

The colour couplers may be 4-equivalent couplers or 2-equivalent couplers. The latter are derived from 4-equivalent couplers in that they contain, in the coupling position, a substituent which is split off in the coupling reaction. 2-Equivalent couplers include colourless couplers as well as couplers which have an intense colour of their own which disappears in the process of colour coupling and may be replaced by the colour of the image dye produced (masking couplers); they also include white couplers which give rise to substantially colourless products in the reaction with colour developer oxidation products. 2-Equivalent couplers also include couplers which contain, in the coupling position, a releasable group which is released in the reaction with colour developer oxidation products and then give rise to a particular photographic activity, e.g. as development inhibitor or accelerator, either directly or after one or more further groups have been split off from the group originally split off (e.g. DE-A-27 03 145, DE-A-28 55 697, DE-A-31 05 026, DE-A-33 19 428). The known DIR couplers as well as DAR and FAR couplers are examples of such 2-equivalent couplers.

The couplers used, i.e. in particular the cyan couplers, for example those of the formulae IV, V, VI and VII, and magenta couplers, e.g. 2-equivalent or 4-equivalent magenta couplers of the pyrazolone or pyrazoloazole series, for example those of formulae X and XI, may also be used in polymeric form, e.g. as polymer latex.

High molecular weight colour couplers are described, for example, in DE-C-1 297 417, DE-A-24 07 569, DE-A-31 48 125, DE-A-32 17 200, DE-A-33 20 079, DE-A-33 24 932, DE-A-33 31 743, DE-A-33 40 376, EP-A-27 284 and U.S. Pat. No. 4,080,211. The high molecular weight colour couplers are generally prepared by polymerisation of ethylenically unsaturated monomeric colour couplers.

The colour couplers used may also be of the type which give rise to dyes having a slight or limited mobility.

By "slight or limited mobility" is meant a mobility which enables the contours of the discrete dye patches produced by chromogenic development to merge into one another. This measure of mobility must be distinguished from the usual case of complete immobility in photographic layers, which is desired of colour couplers and the dyes produced from them in conventional photographic recording materials in order to obtain great sharpness, and from complete mobility of the dyes which is desired, for example, in dye diffusion processes. The last mentioned dyes in most cases have at least one group which renders them soluble in an alkaline medium. The extent of the slight mobility desired according to the invention may be controlled by varying the substituents, for example in order to influence the solubility in the organic medium of the oil former or the affinity for the binder matrix to the extent desired.

In addition to the above-mentioned components, the colour photographic recording material of the present invention may contain additives such as antioxidants, dye stabilizing agents and agents which influence the mechanical and electrostatic properties, as well as UV absorbents. Such additional compounds are advantageously combined with the compounds according to the invention, i.e. used in the same layer of binder or in adjacent layers of binders.

Additives for improving the stability of the dyes, couplers or whites and for reducing the colour fog (Research Disclosure 17643 (Dec. 1978), Chapter VII) may belong to the following classes of chemical substances: Hydroquinones, 6-hydroxychromans, 5-hydroxycoumarans, spirochromans, spiroindans, p-alkoxyphenols, sterically hindered phenols, gallic acid derivatives, methylene dioxybenzenes, aminophenols, sterically hindered amines, derivatives containing esterified or etherified phenolic hydroxyl groups, and metal complexes.

Compounds containing both a sterically hindered amine partial structure and a sterically hindered phenol partial structure in one molecule (U.S. Pat. No. 4,268,593) are particularly effective in preventing the impairment of yellow colour images by heat, moisture or light. Spiroindans (JP-A-159 644/81) and chromans substituted by hydroquinone diethers or monoethers (JP-A-89 835/80) are particularly effective in preventing any impairment of magenta colour images, in particular as a result of the action of light.

The following are examples of particularly suitable compounds:

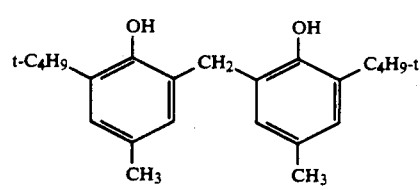

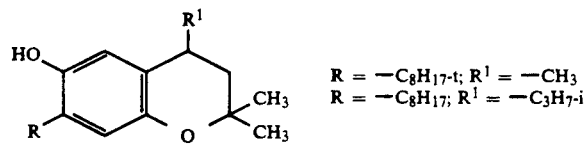

$R = -C_8H_{17}\text{-t}; R^1 = -CH_3$
$R = -C_8H_{17}; R^1 = -C_3H_7\text{-i}$

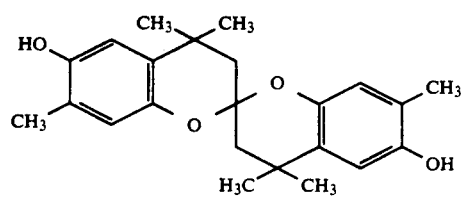

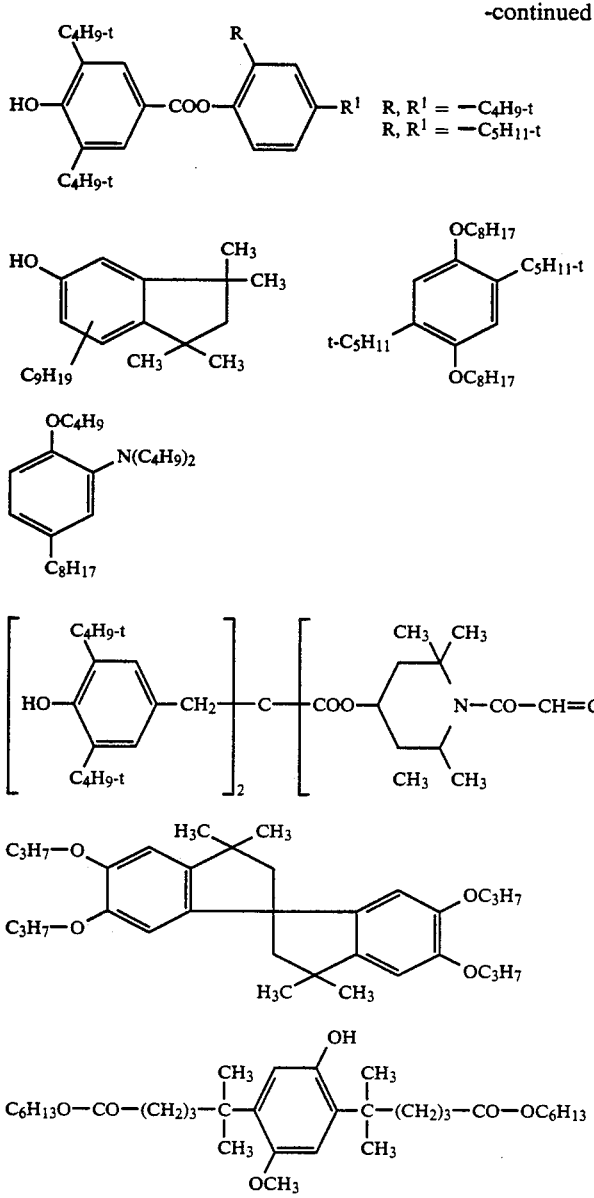

UV Light absorbent compounds are required to protect the image dyes against bleaching by daylight having a high UV content and at the same time to act as filter dyes for absorbing the UV light in daylight used for exposure, thereby improving the colour reproduction of a film. The compounds used for the two different functions generally differ in structure. Examples include aryl-substituted benzotriazole compounds (U.S. Pat. No. 3,533,794), 4-thiazolidone compounds (U.S. Pat. Nos. 3,314,794 and 3,352,681), benzophenone compounds (JP-A-2 784/71), cinnamic acid ester compounds (U.S. Pat. Nos. 3,705,805 and 3,707,375), butadiene compounds (U.S. Pat. No. 4,045,229) and benzoxazole compounds (U.S. Pat. No. 3,700,455).

The following are examples of particularly suitable compounds:

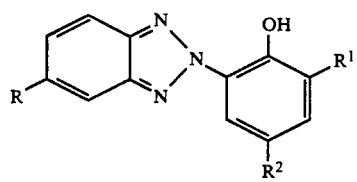

R, R$^1$ = H; R$^2$ = —C$_4$H$_9$-t
R = H; R$^1$, R$^2$ = —C$_4$H$_9$-t
R = H; R$^1$, R$^2$ = —C$_5$H$_{11}$-t
R = H; R$^1$ = —C$_4$H$_9$-s; R$^2$ = —C$_4$H$_9$-t
R = Cl; R$^1$ = —C$_4$H$_9$-t; R$^2$ = —C$_4$H$_9$-s
R = Cl; R$^1$, R$^2$ = —C$_4$H$_9$-t
R = Cl; R$^1$ = —C$_4$H$_9$-t; R$^2$ = —CH$_2$—CH$_2$—COOC$_8$H$_{17}$
R = H; R = —C$_{12}$H$_{25}$-i; R$^2$ = —CH$_3$
R, R$^1$, R$^2$ = —C$_4$H$_9$-t

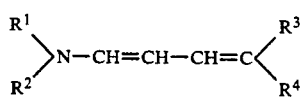

R$^1$, R$^2$ = —C$_6$H$_{13}$; R$^3$, R$^4$ = CN

-continued

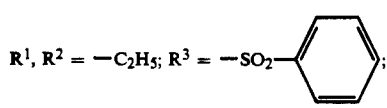

$R^1, R^2 = -C_2H_5; R^3 = -SO_2-\langle\!\!\!\!\bigcirc\!\!\!\!\rangle;$ $R^4 = -CO-OC_8H_{17}$

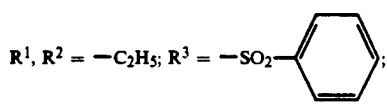

$R^1, R^2 = -C_2H_5; R^3 = -SO_2-\langle\!\!\!\!\bigcirc\!\!\!\!\rangle;$ $R_4 = -COO-C_{12}H_{25}$ $R^1, R^2 = -CH_2=CH-CH_2; R^3, R^4 = -CN$

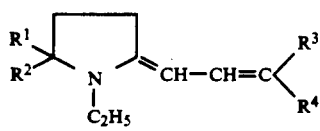

$R^1, R^2 = H; R^3 = -CN; R^4 = -CO-NHC_{12}H_{25}$ $R^1, R^2 = -CH_3; R^3 = -CN; R^4 = -CO-NHC_{12}H_{25}$

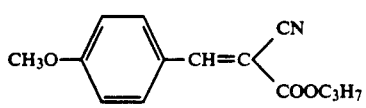

Ultraviolet-absorbent couplers (such as cyan couplers of the α-naphthol series) and ultraviolet absorbent polymers may also be used. These ultraviolet absorbents may be fixed in a particular layer by mordanting.

To produce colour photographic images, the photographic recording material according to the invention, which contains a colour coupler and a compound of Formula I associated with at least one silver halide emulsion layer, is developed with a colour developer compound. The colour developer compound used may be any developer compound which is capable, in the form of its oxidation product, of reacting with colour couplers to form azonethine dyes. Suitable colour developer compounds include aromatic compounds of the p-phenylenediamine series containing at least one primary amino group, for example, N,N-dialkyl-p-phenylenediamines such as N,N-diethyl-p-phenylenediamine, 1-(N-ethyl-N-methylsulphonamido-ethyl)-3-methyl-p-phenylenediamine, 1-(N-ethyl-N-hydroxyethyl)-3-methyl-p-phenylenediamine and 1-(N-ethyl-N-methoxyethyl)-3-methyl-p-phenylenediamine.

Other suitable colour developers are described, for example, in J. Amer. Chem. Soc. 73, 3100 (1951) and in G. Haist, Modern Photographic Processing, 1979, John Wiley and Sons, New York, pages 545 et seq.

The material is normally bleached and fixed after colour development. Bleaching and fixing may be carried out separately or together. The usual bleaching agents may be used, e.g. $Fe^{3+}$ salts and $Fe^{3+}$ complex salts such as ferricyanides, dichromates, water-soluble cobalt complexes, etc. Iron-III complexes of aminopolycarboxylic acids are particularly preferred, in particular, for example, those of ethylene diaminotetracetic acid, N-hydroxyethyl-ethylenediaminotriacetic acid and alkyl iminodicarboxylic acids and of corresponding phosphonic acids. Persulphates are also suitable bleaching agents.

Examples

EXAMPLE 1

Sample 1 (Comparison)

A layer support of paper coated with polyethylene on both sides was covered with the following layers; the quantities given are based on 1 m²:

Layer 1 A substrate layer of 200 mg of gelatine with the addition of $KNO_3$—and chrome alum Layer 2 A bonding layer of 320 mg of gelatine Layer 3 A green-sensitive silver chlorobromide emulsion layer (20 mol-% chloride) of
530 mg of $AgNO_3$ with 750 mg of gelatine,
0.61 g of magenta coupler M-22, emulsified with 0.61 g of tricresyl phosphate (TCP)

Layer 4 A protective layer of 1 g of gelatine and 16 mg of a surfactant corresponding to the formula $C_8F_{17}SO_3^\ominus N(C_2H_5)_4^\oplus$      (NM-1)

To this layer is applied a hardening layer containing 120 mg per m² of a hardener corresponding to the formula

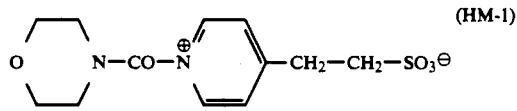

(HM-1)

Samples 2 to 8 (according to the invention)

Samples 2 to 8 were prepared by the same method as Sample 1 except that the tricresyl phosphate used in Sample 1 was replaced by one of the compounds according to the invention (see Table 2).

The samples obtained were exposed behind a graduated grey wedge and the materials were then processed as follows, using the processing baths indicated below:

| | |
|---|---|
| Development: | 210 s, 33° C. |
| Bleaching: | 50 s, 20° C. |
| Fixing: | 60 s, 20° C. |
| Washing: | 120 s, 20° C. |
| Drying. | |
| Composition of the baths | |
| Developer: | |
| Benzyl alcohol | 13 ml |
| Hydroxyl ammonium sulphate | 3 g |
| Sodium sulphite | 2 g |
| 4-amino-N-ethyl-N-(β-methane-sulphon-amido-ethyl)-m-toluidine-sesquisulphate (monohydrate) | 4.5 g |
| Potassium carbonate | 36 g |
| Potassium bromide | 1.4 g |
| Diethylene-triamino-pentacetic acid, pentasodium salt | 2 g |
| Diethyleneglycol | 12 ml |
| made up with water to 1 liter pH = | 10.4 |
| Bleaching bath: | |
| Water | 700 ml |
| NH₄-Fe-EDTA | 65 g |
| EDTA | 10 g |
| NH₄Br | 100 g |
| adjust to pH 6.0 with acetic acid and make up to 1 liter with water | |
| Fixing bath: | |
| Ammonium thiosulphate | 100 g |
| Sodium sulphite sicc. | 10 g |
| Sodium disulphite | 3 g |

-continued

| made up with water to 1 liter. | the maximum colour density was then determined (Table 2).

In addition, the samples were exposed for $4.2 \times 10^6$ Lux. hours to the light of a Xenon lamp standarized for daylight; the percentage decrease in density was then measured (Table 2).

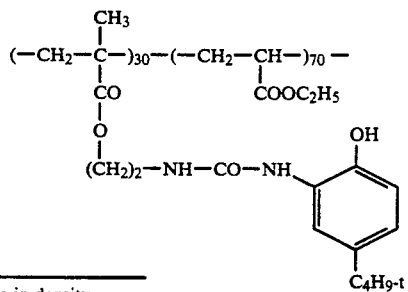

TABLE 2

| Sample | Oil former | % Decrease in density | | | |
|---|---|---|---|---|---|
| | | $D_{max}$ | D = 0.5 | D = 1.0 | $D_{max}$ |
| 1 (Comparison) | 0.61 g tricresylphosphate | 2.33 | 76 | 85 | 68 |
| 2 (according to the invention) | 0.61 g of Compound S-1 | 2.51 | 61 | 67 | 55 |
| 3 (according to the invention) | 1.22 g of Compound S-1 | 2.59 | 26 | 20 | 12 |
| 4 (according to the invention) | 0.61 g of Compound S-2 | 2.37 | 60 | 63 | 58 |
| 5 (according to the invention) | 0.61 g of Compound S-6 | 2.41 | 63 | 59 | 60 |
| 6 (according to the invention) | 0.61 g of Compound S-7 | 2.39 | 58 | 61 | 55 |
| 7 (according to the invention) | 0.61 g of Compound S-8 | 2.45 | 61 | 68 | 56 |
| 8 (according to the invention) | 0.61 g of Compound S-11 | 2.40 | 52 | 58 | 53 |

The Example shows that high maximum colour densities are obtained by using the combination of the compounds according to the invention and at the same time the stability of the image dye to light is improved.

EXAMPLE 2

An arrangement of layers is prepared as described in Example 1 except that magenta coupler M-31 is used in the green sensitive layer instead of magenta coupler M-22. Sample 9 is thus obtained (Comparison).

Samples 10-14 are prepared by the same method as Example 9 except that the tricresyl phosphate used in Example 9 is replaced by one of the compounds according to the invention. Sample 15 is similarly prepared but using Comparison polymer VP-1. The samples are processed and examined as in Example 1.

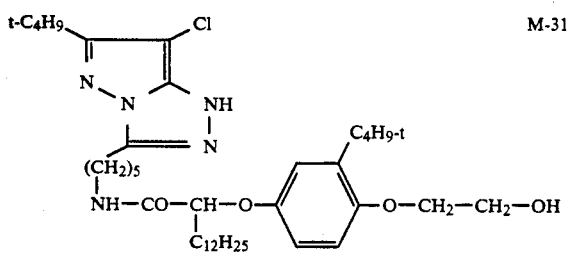

TABLE 3

| Sample | Oil former | | % Decrease in density | | | |
|---|---|---|---|---|---|---|
| | | | $D_{max}$ | D = 0.5 | D = 1.0 | $D_{max}$ |
| 9 (Comparison) | 0.61 g | TCP | 1.47 | 54 | 57 | 35 |
| 10 (according to the invention) | 0.61 g | Compound S-8 | 1.51 | 31 | 29 | 17 |
| 11 (according to the invention) | 1.22 g | Compound S-8 | 1.50 | 22 | 18 | 13 |
| 12 (according to the invention) | 0.61 g | Compound S-1 | 1.54 | 19 | 19 | 15 |
| 13 (according to the invention) | 1.22 g | Compound S-1 | 1.51 | 16 | 15 | 8 |
| 14 (according to the invention) | 0.61 g | Compound S-9 | 1.55 | 39 | 37 | 24 |
| 15 (Comparison) | 0.61 g | VP-1 | 1.14 | 41 | 43 | 39 |

The Example shows that the compounds according to the invention improve the stability to light of the image dyes. Polymer VP-1 of DE-A-35 01 722 used for comparison provides less improvement in the stability to light and a markedly reduced maximum colour density.

EXAMPLE 3

Sample 16 (Comparison)

A layer support of paper coated with polyethylene on both sides was covered with the following layers; the quantities given are based on 1 m²:

Layer 1: A substrate layer of 200 mg of gelatine with the addition of $KNO_3$—and chrome alum.

Layer 2: A bonding layer of 320 mg of gelatine.

Layer 3: A blue-sensitive silver chlorobromide emulsion layer (20 mol-% chloride) of 450 mg of $AgNO_3$ with 1600 mg of gelatine, 0.78 g of yellow coupler Y-9 and 27.7 mg of 2,5-dioctylhydroquinone emulsified with 0.78 g of TCP. The emulsion was prepared with a grain size of 0.8 μm by double injection, flocculated in the usual manner, washed and redispersed with gelatine. The ratio by weight of gelatine/silver (as $AgNO_3$) was 0. 5. The emulsion was then ripened to optimum sensitivity with 60 μmol of thiosulphate per mol of Ag, sensitized to the blue spectral region and stabilized.

Layer 4 A protective layer of 1 g of gelatine and 16 mg of surfactant NM-1.

A hardening layer containing 120 mg of the hardener HM-1 per m² is applied to this layer.

Samples 17-20 (according to the invention)

Samples 17-20 were prepared by the same method as Sample 16 except that the tricresyl phosphate used in Example 16 was replaced by one of the compounds according to the invention (see Table 4).

The samples were exposed and processed as described in Example 1. They were exposed for $19.2 \times 10^6$ Lux. hours to the light of a xenon lamp standardized for daylight. The decrease in density was then measured.

TABLE 4

| Sample | Oil former | | $D_{max}$ | % Density decrease |
| --- | --- | --- | --- | --- |
| 16 (Comparison) | 0.78 g | TCP | 2.30 | 61 |
| 17 (according to the invention) | 0.78 g | S-6 | 2.35 | 48 |
| 18 (according to the invention) | 0.78 g | S-9 | 2.31 | 44 |
| 19 (according to the invention) | 0.78 g | S-1 | 2.33 | 39 |
| 20 (according to the invention) | 0.78 g | S-2 | 2.35 | 45 |

EXAMPLE 4

Sample 21

A red-sensitized cyan emulsion layer 15 μm in thickness was applied to a cellulose triacetate support covered with a 4 μm thick antihalation layer consisting of gelatine and black colloidal silver.

The layer contained the following per m²:
8.13 g of gelatine
5.45 g of TCP
7.13 g of silver bromide and
2.7 g of magenta coupler M-22

In subsequent samples, TCP was replaced by the compounds according to the invention, S-1, S-6 and S-12 (Samples 22 to 24).

The layers were conditioned to a climate of 23° C. and 20% relative humidity after drying.

The breaking strength was determined by means of the following apparatus:

A loop of film is clamped with its emulsion layer to the outside in a parallel jaw apparatus equipped with pressure gauge. The movable jaw moves towards the fixed jaw up to twice the film thickness with a squeezing velocity of 10 cm/s and then returns.

The force/path is plotted electronically and automatically by an XY writer.

When the film breaks,
1. breaking force and
2. the diameter of the loop at breakage
are measured. The higher the breaking force and the lower the diameter of the loop, the lower is the breaking strength of the film.

| | Breaking strength (23° C., 20% r.h.) | |
| --- | --- | --- |
| Sample | Diameter of loop at breakage [mm] | Breaking force [N] |
| 21 (Comparison) | 0.5 | 27 |
| 22 (according to the invention) | 0.3 | 36 |
| 23 (according to the invention) | 0.4 | 31 |
| 24 (according to the invention) | 0.4 | 30 |

The values show that when the compounds according to the invention are used as oil formers, the mechanical properties are improved and the layers have improved breaking strengths.

EXAMPLE 5

A color photographic recording material for rapid processing was prepared by application of the following layers in the order indicated to a layer support of paper coated on both sides with polyethylene. The quantities shown are all based on 1 m². For the silver halide applied, the corresponding quantities of $AgNO_3$ are shown.

Material 1 (comparison)

1st layer (substrate layer)
  0.2 gelatine

2nd layer (blue-sensitive layer)
  blue-sensitive silver halide emulsion (99.5 mol-% chloride, 0.5 mol-% bromide, average grain diameter 0.8 μm) of 0.63 g $AgNO_3$ containing
  1.38 g gelatine
  0.95 g yellow coupler Y-9
  0.2 g white coupler W-1
  0.29 g tricresyl phosphate (TCP)

3rd layer (protective layer)
  1.1 g gelatine
  0.06 g 2,5-dioctyl hydroquinone
  0.06 g dibutyl phthalate (DBP)

4th layer (green-sensitive layer)
  green-sensitized silver halide emulsion (99.5 mol-% chloride, 0.5 mol-% bromide, average grain diameter 0.6 μm) of 0.45 g $AgNO_3$ containing
  1.08 g gelatine
  0.41 g magenta coupler M-22
  0.08 g 2,5-dioctyl hydroquinone
  0.5 g TCP.

5th layer (UV-absorbing layer)
  1.15 g gelatine
  0.6 g UV absorber corresponding to the formula

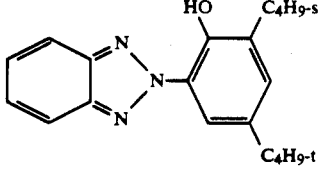

0.045 g 2,5-dioctyl hydroquinone
  0.04 g TCP

6th layer (red-sensitive layer)
  red-sensitised silver halide emulsion (99.5 mol-% chloride, 0.5 mol-% bromide, average grain diameter 0.5 μm) of 0.3 g $AgNO_3$ containing
  0.75 g gelatine
  0.36 g cyan coupler C-24
  0.36 g TCP 7th layer (UV-absorbing layer)
  0.35 g gelatine
  0.15 g of the same UV absorber as in the 5th layer
  0.2 g TCP 8th layer (protective layer)
  0.9 g gelatine
  0.3 g hardener HM-1 the white coupler used in the 2nd layer has the following formula

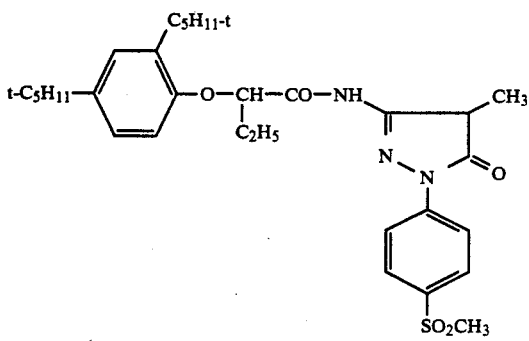

Materials 2 to 6 (according to the invention)

Materials 2 to 6 were prepared in the same way as Material 1 with the exception that TCP used in the 4th layer was replaced by the same amount of a compound of the present invention as shown in Table 6.

Materials 1 to 6 were exposed behind a graduated grey wedge and were then processed using the processing baths indicated below.

| a) | color developer - 45 s | 35° C. |
|---|---|---|
| | Triethanolamine | 9,0 g |
| | N,N-Diethylhydroxylamine | 4,0 g |
| | Diethylenglykol | 0,05 g |
| | 3-methyl-4-amino-N-ethyl-N-methan-sulfonamidoethyl-anilin-sulfate | 5,0 g |
| | Potassium sulfite | 0,2 g |
| | Triethylenglykol | 0,05 g |
| | Potassiumcarbonate | 22 g |
| | Potassium hydroxide | 0,4 g |
| | Disodium ethylendiamintetraacetate | 2,2 g |
| | Potassium chloride | 2,5 g |
| | 1,2-Dihydroxybenzene-3,4,6-trisulfic acid-trisodium salt | 0,3 g |
| | make up with water to 1,000 ml; pH 10,0 | |
| b) | Blix - 45 s | 35° C. |
| | Ammonium thiosulfate | 75 g |
| | Sodium hydrogensulfite | 13,5 g |
| | Ammonium acetate | 2,0 g |
| | Ethylendiamintetracetic acid Fe/NH$_4$-salt | 57 g |
| | Ammonia 25% | 9,5 g |
| | Acetic acid | 9,0 g |
| | make up with water to 1,000 ml; pH 5,5 | |
| c) | Rinsing - 2 min | 33° C. |

The maximum color density was determined in all of the materials 1 to 6. Further the materials were exposed for 4.2×10$^6$ lx.h to the light of a Xenon lamp standardized for daylight. The percent decrease in density was then measured as shown in Table 6.

TABLE 6

| Material | Oil former in layer 4 | $D_{max}$ | Density decrease [%] D = 0.5 | 1.0 | $D_{max}$ |
|---|---|---|---|---|---|
| 1 (Comparison | TCP | 1,75 | 58 | 68 | 55 |
| 2 (Invention) | S-1 | 1,83 | 43 | 48 | 42 |
| 3 (Invention) | S-2 | 1,55 | 40 | 45 | 41 |
| 4 (Invention) | S-6 | 1,79 | 42 | 47 | 40 |
| 5 (Invention) | S-8 | 1,51 | 43 | 48 | 41 |
| 6 (Invention) | S-11 | 1,83 | 38 | 44 | 38 |

EXAMPLE 6

A colorant photographic recording material for color negative development was prepared by applying the following layers in the given sequence to a transparent layer support of cellulose triacetate. The quantities refer in each case to 1 m$^2$. the quantities of silver halide applied are given in terms of the corresponding equivalent quantities of AgNO$_3$. All silver halide emulsions were stabilized with 0.5 of 4-hydroxy-6-methyl-1,3,3a,7-tetraazaindene per 100 g of AgNO$_3$.

Material 7 (Comparison)

Layer 1 (antihalation layer)

black colloidal silver sol containing
 0.2 g of Ag,
 1.2 g of gelatine,
 0.1 UV absorber UV-1,
 0.2 UV absorber UV-2,
 0.02 g of tricresyl phosphate (TCP) and
 0.03 g of dibutyl phthalate (DBP);

Layer 2 (micrat interlayer)

silververiodobromide micrat emulsion (0.5 mol%) iodide; average grain diameter diameter 0.07 μm) obtained from 0.25 of AgNO$_3$, containing
 1.0 g of gelatine,
 0.05 g of red mask MR-1 and
 0.10 g of TCP;

Layer 3 (1st red sensitized layer)

red sensitized silver iodobromide emulsion (4 mol% iodide; average grain diameter 0.45 μm) obtained from 2.2 g of AgNO$_3$, containing
 2.0 g of gelatine,
 0.6 g of cyan coupler C-19
 0.5 g of read mask MR-1,
 0.03 g of DIR coupler DIR-1
 0.52 g of TCP;

Layer 4 (2nd red-sensitized layer)

red-sensitized silver bromide iodide emulsion (8.5 mol-% iodide; average grain diameter 0.8 μm) of 2.8 g AgNO$_3$, containing
 0.18 g of gelatine,
 0.15 g of cyan coupler C-2,
 0.15 g of DBP Layer 5 (Intermediate layer)

0.7 g gelatine
 0.2 g of 2,5-diisooctyl hydroquinone,
 0.15 g of DBP,

Layer 6 (1st green-sensitized layer)

green-sensitized silver bromide iodide emulsion (4.5 mol-% iodide; average grain diameter 0.4 μm) of
 1.8 g AgNO$_3$, containing
 1.6 g of gelatine,
 0.6 g of magenta coupler XM-1,
 0.05 g of yellow mask MY-1,
 0.03 g of DIR coupler DIR-2,
 0.08 g of DIR coupler DIR-3,
 0.11 g of TCP,
 0.02 g of DBP Layer 7 (2nd green-sensitized layer)

green-sensitized silver bromide iodide emulsion (7 Mol-% iodide; average grain diameter 0.7 μm) of 2.2 g of AgNO$_3$, containing
 1.4 g of gelatine,
 0.15 g of magenta coupler M-18,
 0.03 g of yellow mask MY-1,
 0.48 g of TCP Layer 8 (intermediate layer)

0.5 g of gelatine,
 0.1 g of diisooctyl hydroquinone,
 0.08 g of DBP

Layer 9 (Yellow filter layer)

yellow collodoidal silver sol containing
0.2 g of Ag,
0.9 g of gelatine,
0.2 g of diisooctyl hydroquinone,
0.16 g of DBP Layer 10 (1st blue-sensitive layer)
blue-sensitized silver bromide iodide emulsion (4.9 mol-% iodide;
average grain diameter 0.45 μm) of 0.6 g of AgNO$_3$, containing
0.85 g of gelatine
0.7 g of yellow coupler XY-1,
0.15 g of DIR coupler DIR-3,
0.85 g of TCP Layer 11 (2nd blue-sensitive layer)
blue-sensitized silver bromide iodide emulsion (9 mol-% iodide;
average grain diameter 0.9 μm) of 1.0 g of AgNO$_3$, containing
0.85 g of gelatine,
0.3 g of yellow coupler XY-1,
0.3 g of TCP Layer 12 (Protective and hardening layer)
silver bromide iodide micrat emulsion (0.5 mol-% iodide; average grain diameter 0.07 μm) of 0.5 g of AgNO$_3$, containing
1.2 g of gelatine,
0.4 g of hardener HM-2,
1.0 g of formaldehyde scavenger FF.

In material 7 the following further compounds were used

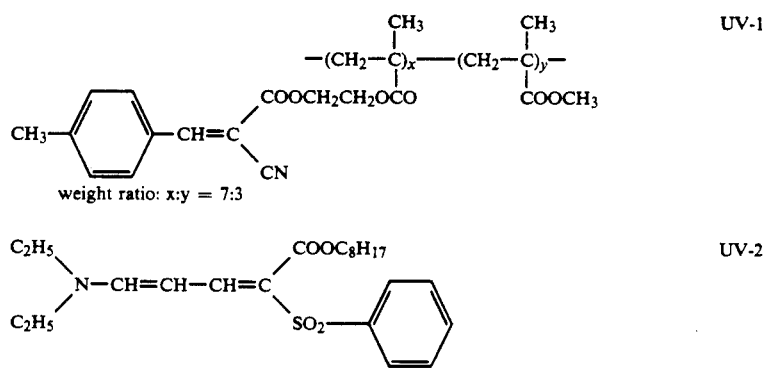

UV-1, UV-2

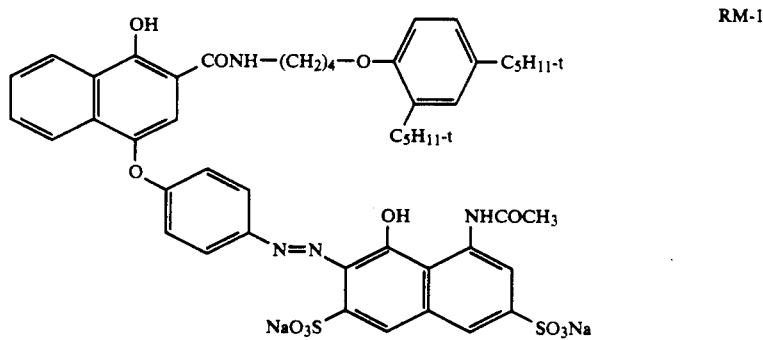

RM-1

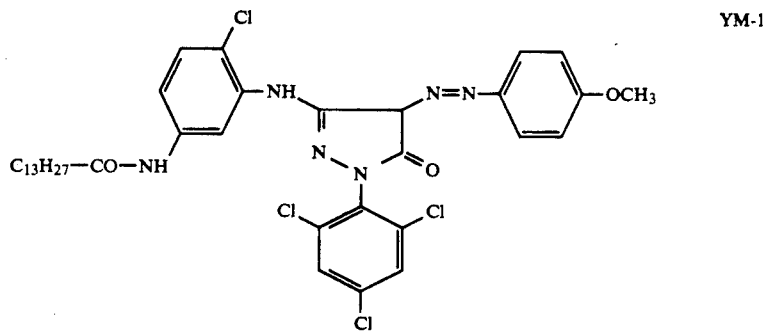

YM-1

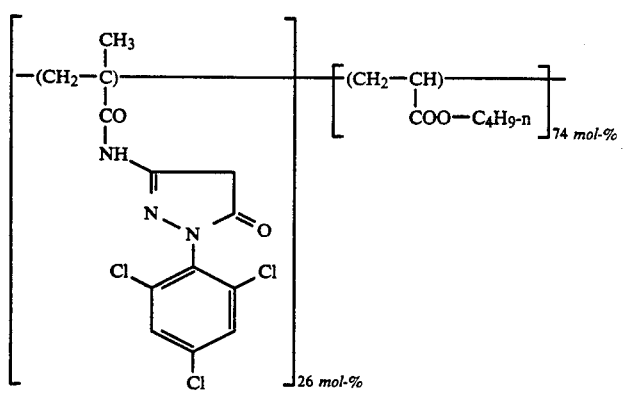
XM-1
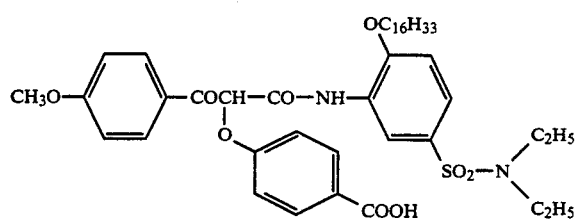
XY-1
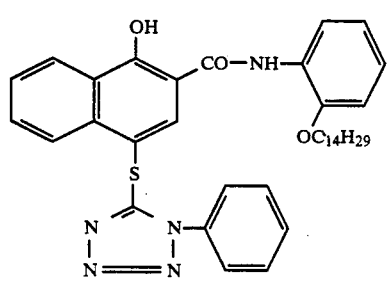
DIR-1
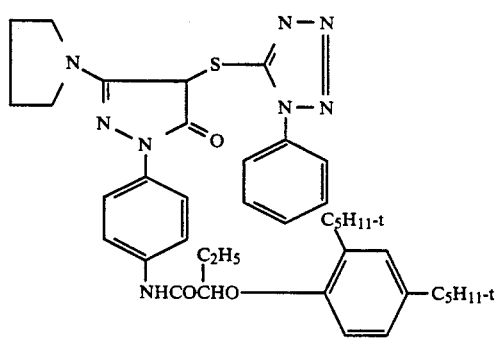
DIR-2
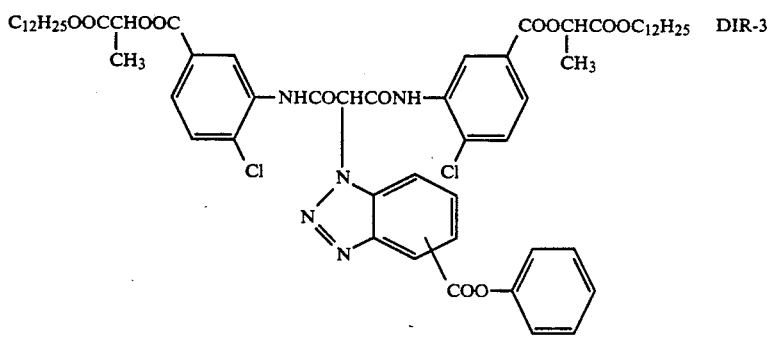
DIR-3

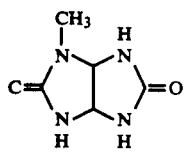

CH₂=CH—SO₂—CH₂—CONH—CH₂
CH₂=CH—SO₂—CH₂—CONH—CH₂

Material 8 to 10 (according to the invention)

Materials 8 to 10 were prepared in the same way as material 7 with the exception that TCP and DBP were replaced in all layers by the same amount of compounds S-1, S-9 and S-12 according to the invention as shown in the following table.

After drying the materials were conditioned to a climate of 23° C. and 20% relative humidity.

The breaking strength was determined as described in Example 4.

TABLE 7

| material | oil former | breaking strength (23° C., 20% r.h.) | |
|---|---|---|---|
| | | diameter of loop at breakage [mm] | breaking force [N] |
| 7 (comparison) | TCP/DBP | 0.8 | 23 |
| 8 (invention) | S-1 | 0.3 | 34 |
| 9 (invention) | S-9 | 0.4 | 30 |
| 10 (invention) | S-12 | 0.4 | 31 |

The compound of the invention if used as oilformers improve the mechanical properties and the breaking strength of the materials.

I claim:

1. Color photographic recording material having at least one silver halide emulsion layer and a color coupler associated with this layer, containing, associated with at least one light-sensitive silver halide emulsion layer, a combination of a color coupler and a compound corresponding to the general formula I

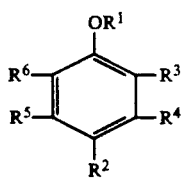
(I)

wherein
R¹ denotes H, a group which can be split off under alkaline conditions, alkyl or aryl,
R² denotes OH, alkyl, aryl, alkoxy or

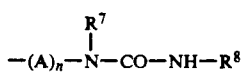

R³, R⁴, R⁵ and R⁶ denote H, OH, COOH, SO₃H, SO₂H, alkyl, aryl, alkoxy, alkylsulphonyl, arylsulphonyl, sulphamoyl, unsubstituted or substituted by at least one of the following: alkyl, aryl, acylamino or

and at least one of the groups R², R³, R⁴, R⁵ and R⁶ is a group corresponding to the formula

in which
A denotes alkylene with 1-6 carbon atoms,
n equals 0 or 1,
R⁷ denotes H or an alkyl group which is substituted or unsubstituted and
R⁸ denotes the residue of a polymer produced by polycondensation;
or, R¹ and R³ form a 5-member of 6-member ring, in which case R²=OH or alkoxy or
R² and R⁴ form a 5-membered or 6-membered carbocyclic ring.

2. Recording material according to claim 1, wherein at least one silver halide emulsion layer has associated with it a compound of the Formula I in combination with a magenta coupler or a yellow coupler.

3. Recording material according to claim 2, wherein at least one silver halide emulsion layer has associated with it a compound of Formula I in combination with a pyrazoloazole coupler.

4. Recording material according to claim 3, wherein the pyrazoloazole coupler corresponds to one of the Formulae X and XI

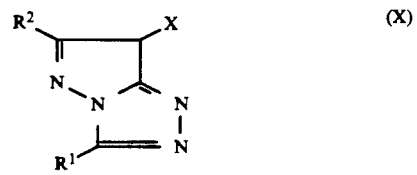
(X)

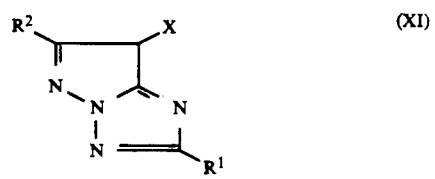
(XI)

wherein
X denotes H or a group which is releasable under the conditions of color development and
R¹ and R² denote H, alkyl, aralkyl, aryl, alkoxy, aroxy, alkylthio, arylthio, amino, anilino, acylamino, cyano, alkoxycarbonyl, carbamoyl or sulphamoyl, these groups being unsubstituted or further substituted.

* * * * *